US010732954B2

(12) United States Patent
Bala et al.

(10) Patent No.: US 10,732,954 B2
(45) Date of Patent: Aug. 4, 2020

(54) USER ENGAGEMENT AWARE AUTO-UPDATER

(71) Applicant: Dropbox, Inc., San Francisco, CA (US)

(72) Inventors: Karthik Bala, Cupertino, CA (US); Jonathan Chien, San Francisco, CA (US); Agueda Chacon, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 61 days.

(21) Appl. No.: 15/396,279

(22) Filed: Dec. 30, 2016

(65) Prior Publication Data
US 2018/0189048 A1 Jul. 5, 2018

(51) Int. Cl.
*G06F 9/445* (2018.01)
*G06F 8/65* (2018.01)
*G06F 8/656* (2018.01)
*H04L 29/06* (2006.01)
*H04L 12/24* (2006.01)
*H04W 4/70* (2018.01)

(52) U.S. Cl.
CPC .............. *G06F 8/65* (2013.01); *G06F 8/656* (2018.02); *H04L 29/06* (2013.01); *H04L 41/082* (2013.01); *H04W 4/70* (2018.02)

(58) Field of Classification Search
CPC . G06F 8/65; G06F 8/654; G06F 8/656; G06F 8/665; G06F 8/67; H04L 29/06; H04L 29/08; H04L 41/0206; H04L 41/0233; H04L 41/069; H04L 41/082; H04L 41/0873; H04L 43/16; H04L 43/0817; H04L 67/10; H04W 4/005; H04W 4/70

USPC .......................................................... 717/173
See application file for complete search history.

(56) References Cited

U.S. PATENT DOCUMENTS

| 5,349,662 A | 9/1994 | Johnson et al. |
| 8,583,103 B2 | 11/2013 | Avadhanam et al. |
| 9,508,040 B2 | 11/2016 | Bilal et al. |
| 9,569,426 B1 | 2/2017 | Bostick et al. |
| 2002/0056011 A1 | 5/2002 | Nardone et al. |
| 2002/0069282 A1* | 6/2002 | Reisman ............... G06F 8/65 709/227 |
| 2006/0123428 A1 | 6/2006 | Burns |

(Continued)

OTHER PUBLICATIONS

Final Office Action from U.S. Appl. No. 16/034,683, dated Oct. 3, 2019, 28 pages.

(Continued)

*Primary Examiner* — Wei Y Zhen
*Assistant Examiner* — Mohammed N Huda
(74) *Attorney, Agent, or Firm* — Polsinelli PC

(57) ABSTRACT

The present technology pertains to a technique for updating an application; the technique seeks to select when to install the update to minimize interrupting a user experience with the application. For example, a system can download an update for the application and obtain an activity flag. This activity flag can indicate that the application will interrupt the user. The system can set the flag based on identifying a match between a flow profile and a current operative flow. The flow profile can be predefined and specify one or more user engagements. The operative flow can be identified based on a detection of one or more current user engagements with the application.

25 Claims, 9 Drawing Sheets

(56) References Cited

U.S. PATENT DOCUMENTS

| | | |
|---|---|---|
| 2006/0156157 A1 | 7/2006 | Haselden et al. |
| 2007/0214429 A1 | 9/2007 | Lyudovyk et al. |
| 2011/0113010 A1 | 5/2011 | Barber et al. |
| 2014/0248852 A1* | 9/2014 | Raleigh et al. .......... H04W 4/70 |
| | | 455/407 |
| 2015/0177938 A1 | 6/2015 | Kleinpeter et al. |
| 2015/0373132 A1* | 12/2015 | Mukherji et al. ....... H04L 67/22 |
| | | 709/203 |
| 2016/0048421 A1 | 2/2016 | Hanson et al. |
| 2016/0196132 A1* | 7/2016 | Searle et al. .............. G06F 8/65 |
| | | 717/173 |
| 2017/0289240 A1 | 10/2017 | Ghare et al. |
| 2018/0082552 A1 | 3/2018 | Moussette et al. |

OTHER PUBLICATIONS

Advisory Action from U.S. Appl. No. 16/034,683, dated Jan. 21, 2020, 3 pages.

\* cited by examiner

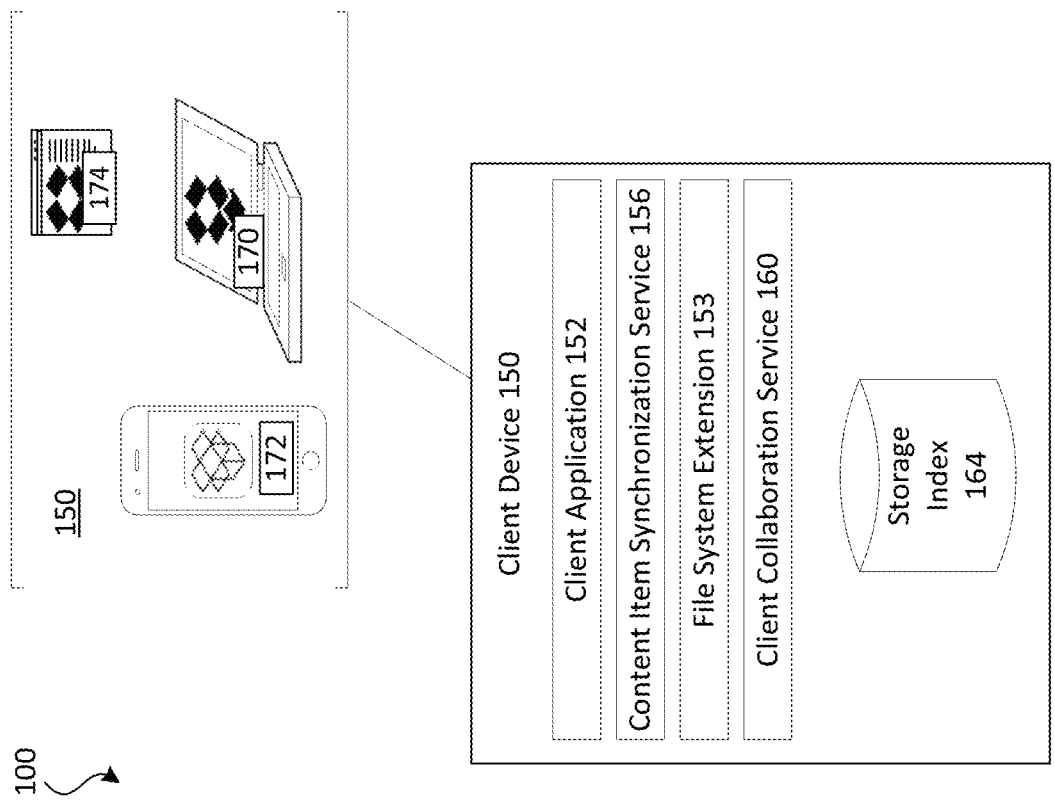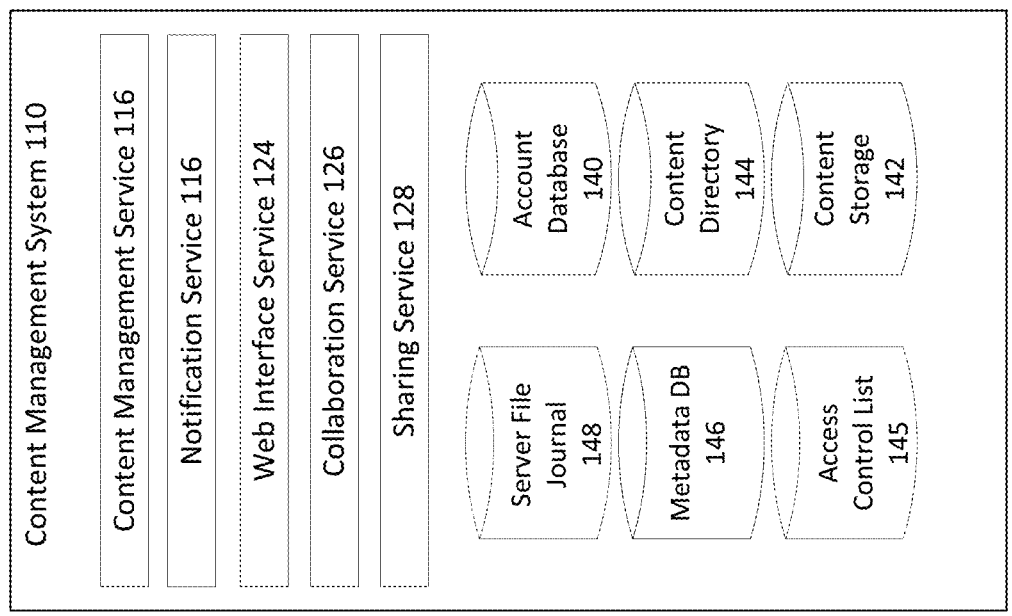
FIG. 1

USER ENGAGEMENT AWARE AUTO-UPDATER

BACKGROUND

Many applications receive updates over their lifetime. These application updates sometimes require the application to restart or otherwise suspend normal operation during installation of the updates. For many processes (e.g., those with a user interface), restarting the application while a user is engaged can disrupt the user experience or confuse a user. To overcome these problems, some application updaters wait until the application has terminated while others will prompt the user to restart the application. Some application updaters will update the application regardless of the user experience. These approaches can result in delays in applying updates and/or an unsatisfactory user experience.

SUMMARY

Additional features and advantages of the disclosure will be set forth in the description which follows, and in part will be apparent from the description, or can be learned by practice of the herein disclosed principles. The means of the instruments and combinations particularly pointed out in the appended claims can realize and obtain various features and advantages of the disclosure. These and other features of the disclosure will become more fully apparent from the following description and appended claims.

The present technology provides a technique for automatically updating an application installed on a computing system in a way that seeks to avoid interrupting user engagement with the application. The technique makes it possible to update the application in a more timely fashion and without prompting the user to install the update, while providing a more positive user experience. When an update is available, a computing system can use a user engagement aware auto-update process to determine an appropriate time to install the update. The auto-updater can include one or more defined flow profiles, which can be used to determine whether or not installing the update will interrupt user engagement with the application. A flow profile can be a defined set or sequence of one or more user engagements that should not be interrupted by an update. The computing system can determine an appropriate time to install the update by identifying a match between a flow profile and an operative flow of user engagements. Like a flow profile, an operative flow can be a set or sequence of one or more user engagements with the application, but an operative flow differs in that the set or sequence captures currently observed or detected user engagements representing a user's current interaction with the application.

To identify a match between an operative flow and a flow profile, the computing system can compare the one or more user engagements in the operative flow with the one or more engagements in the flow profile. Some flow profiles may require an exact match between the user engagements in the operative flow and the flow profile. However, other flow profiles may only require a partial match. For example, the computing system may detect a match when the one or more user engagements in the operative flow match a subset or portion of the flow profile, e.g., the first two of four user engagements in the sequence. Once a match is detected, the computing system can set an activity flag (e.g., to active) to indicate that there is current user engagement with the application that should not be interrupted. In some cases, the match detection can be triggered by an available update. However, the computing system can also perform the match detection as an ongoing process.

Prior to installing the update, the computing system can check whether the update will interrupt user engagement by determining whether there is an active match between an operative flow and a flow profile, e.g., by checking the activity flag. When the computing system detects an active match, the computing system can delay installing the update. The duration of the delay can be based on a variety of factors, such as a defined amount of time or a change in user engagement with the application, e.g., a change in the status of the activity flag. The computing system can update the status of the activity flag to inactive in response to expiration of a defined time duration or detecting that an operative flow no longer matches any flow profiles, e.g., the one or more user engagements defined for the matching flow profile were completed or the user engagement terminated without completing the matching flow profile. Once the computing system detects an inactive activity status, the computing system can install the update.

The delay can be flow profile dependent. For example, a first flow profile can be defined to require at least a specified time duration for the delay; a second flow profile can be defined to require that the flow profile be inactive, e.g., the computing system does not detect an active match between an operative flow and the second flow profile; or a third flow profile can be defined to require that the flow profile be inactive unless a specified time duration has been exceeded. If necessary the delay can be overridden based on the type of the update. For example, if the update is a critical update, the computing system can forgo the delay and interrupt the user engagement to install the update.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not, therefore, to be considered to be limiting of its scope, the principles herein are described and explained with additional specificity and detail through the use of the accompanying drawings in which:

FIG. 1 shows an example configuration of devices and a network in accordance with some embodiments;

DETAILED DESCRIPTION

Figure 2:
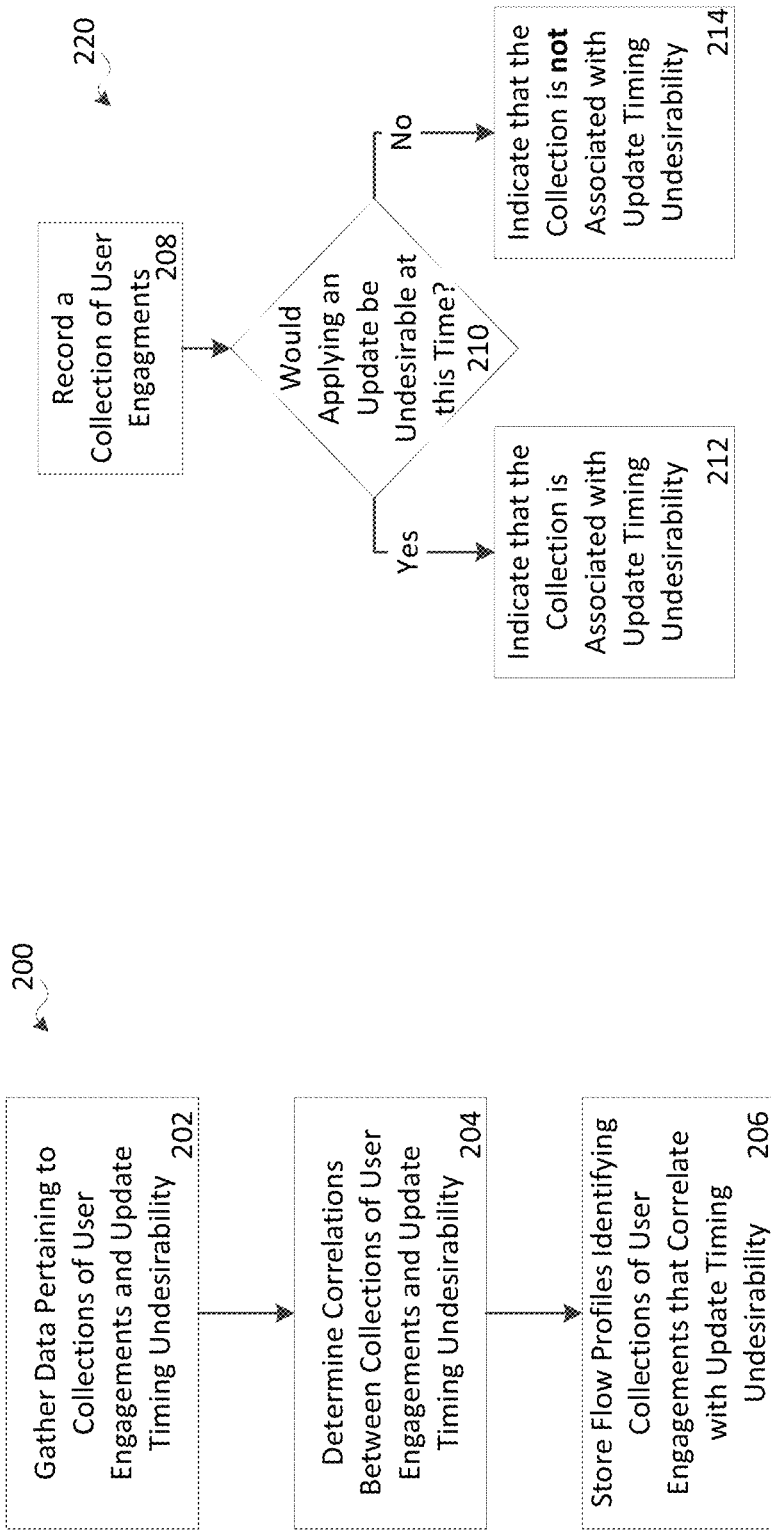
FIG. 2A shows an example method for defining flow profiles.
FIG. 2B shows an example method for associating user engagements with update timing undesirability.

Any discussion herein of specific embodiments is for illustration purposes only. A person skilled in the relevant art will recognize that using other components and configurations may be used without parting from the spirit and scope of the disclosure.

As used herein, the term "user" shall be considered to mean a person, organization, user account, or program associated with a computing system. Actions performed by a user shall be considered to be actions taken by a user to provide an input or to otherwise control processes of the computing system.

The disclosed technology addresses the need in the art for updating an application that engages a user. In previous approaches, an application updater process might wait until a user closed the application so that the updater process could update the application. If the user did not close the application within an appointed time, the updater process might prompt the user to restart and update the application. Some updater processes would force the application to restart after the user failed to restart the application. These previous approaches can be disruptive to a user experience, cause loss of context for the user, result in lost data, present security risks, and make the computing system less useable.

Computing systems can update themselves without human interaction, which presents unique opportunities and problems. For example, managing automatic updating amidst human interaction is a unique and difficult task that has caused confusion or poor user experiences and has prevented many software programs from being up to date.

Disclosed herein are systems and techniques for updating an application in a timely manner but with minimal disruption to a user experience. This can include monitoring user engagements for the application (e.g., the application to be updated), detecting operative flows that match flow profiles, and registering those flows as active with a user interface watcher process. When a user interface watcher process detects that an operative flow matches a registered flow profile, the user interface watcher process can set a user activity flag (e.g., set the user activity flag to active or increment a count of active registered flows). When the user interface watcher process detects that there are no active registered flows, the user interface watcher process can update the status of the user activity flag (e.g., set the user activity flag to inactive). When the user activity flag status indicates that there are no active registered flows (which can indicate that the user would not be interrupted by an update), the application updater can proceed to install the update. If the update is a critical update, it can be applied despite there being active registered flows.

In some embodiments the disclosed technology is deployed in the context of a content management system having content item synchronization capabilities and collaboration features, among others. An example of a system configuration 100 is shown in FIG. 1, which includes content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 140. Account database 140 can store profile information for registered entities. In some cases, profile information for a registered entity can include a username and/or email address. Account database 140 can include account management information, such as account type (e.g., various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies and/or access control lists, and members of a group can inherit the permissions. For example, a marketing group can have access to one set of content items while an engineering group can have access to another set of content items. An administrator of a group can modify groups, modify user accounts, etc.

Content Item Storage

A feature of content management system 110 is the storage of content items, which can be stored in content storage 142. As used herein, content items can be any digital data such as documents, collaborative content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can recognize content item duplicates as such since the deterministic hash function will generally output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 150 depending on the file system used by client device 150.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control service that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications executing on the device. Client device 172 is a computing device in which content items may only be accessible to a specific application or by permission given by the specific application, and the content items can be stored in an application specific space and/or in a remote network. Client device 174 is any client device accessing content management system 110 via a web browser and accessing content items via a web interface. While example client devices 170, 172, and 174 are depicted in form factors such as a laptop, mobile device, or web browser, it should be understood that these descriptions do not limit clients devices to these form factors. For example, a mobile device, such as client device 172, may have a local file system accessible by multiple applications executing on the device, or client device 172 may access content management system 110 via a web browser. As such, the form factor should not be considered limiting when considering client device 150's capabilities. One or more functions described in this disclosure with respect to client device 150 may or may not be available on every client device depending on the specific capabilities of the device—the file access model being one such capability.

In many embodiments, client devices are associated with an account of content management system 110, but in some embodiments client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying types, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments in which client device 150 initiates synchronization of content items with content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150.

When file system extension 156 detects a write, move, copy, or delete command, it can notify content item synchronization service 156, which can synchronize the changes to content management system service 116. In some embodiments, content item synchronization service 156 can perform some functions of content management system service 116 including functions addressed above such as dividing a content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and/or deleting content on client storage as appropriate. Content management service 116 can store the changed or new block for the content item and update server file journal 148, metadata database 146, content directory 144, content storage 142, account database 140, etc., as appropriate.

When synchronizing content from content management system 110 to client device 150, a modification, addition, deletion, and/or move of a content item recorded in server file journal 148 can trigger delivery of a notification to client device 150 using notification service 117. When client device 150 receives the notification of the change to server file journal 148, client device 150 can check storage index 164 to determine if the time stamp of the change occurred since the last synchronization, or determine if the specific change has been synchronized. When client device 150 determines that it is out of synchronization with content management system 110, content item synchronization service 156 can request content item blocks including the changes, and client device 150 can update its local copy of the changed content items. In some embodiments, notification service 117 can query other services or databases of content management system 110, such as server file journal 148, to gain more context for the notification, to determine if a notification can be batched with another notification, or to supplement a notification, etc.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and improve performance of client device 150 and content management system 110 by reducing the processing, memory, storage, and network resources that would otherwise be consumed by synchronizing all content.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible through web interface service 124 or the directory structure associated with the additional user's account on client device 150. The sharing can be performed in a platform agnostic manner. That is, the content can be shared across multiple client devices 150 of varying types, capabilities, operating systems, etc. The content can also be shared across varying types of user accounts.

To share a content item within content management system 110, sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL, or that the URL exists, in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, e.g., from within a corporate network domain.

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request an upload location from sharing service 128, and provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 160 can request notifications service 117 to send notifications to other client devices having access to the shared content item when any one client device accesses the shared content item. Notifications service 117 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 117 to other user accounts to determine which user accounts have (or have not) interacted with the shared content item.

In some embodiments, collaboration service 126 can facilitate commenting associated with content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Collaboration Content Items

Collaboration service 126 can also provide an interactive content item collaboration platform in which users can simultaneously make changes to collaboration content items, provide comments regarding the collaboration content items, manage tasks associated with the collaboration content items, etc. These collaboration content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements can be stored in a database entity to allow for search and retrieval of the collaboration content items. Multiple user accounts may access, view, edit, and otherwise collaborate on collaboration content items at the same time or at different times. In some embodiments, this can be managed through a web interface that enables two users to work on the same copy of a collaboration content item at the same time.

Collaboration Companion Interface

In some embodiments client collaboration service 160 can provide a native application companion interface for the purpose of displaying information relevant to a content item being presented on client device 150. In some embodiments, a certain content item is accessed by a native application stored and executed on client device 150, where the content item is in a designated location of the file system of client device 150 such that the content item is managed by content application 152, the native application may not provide any native way to display the above addressed collaboration data addressed above. In such embodiments, client collaboration service 160 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 150, can programmatically make API calls directly to content management system 110 when a user account provides authentication credentials, to read, write, create, delete, share, or otherwise manipulate content.

A user can utilize a user account to view or manipulate content using a web interface generated and served by web interface service 124. For example, the user can navigate in a web browser to a web address associated with the user account provided by content management system 110. Changes or updates to content in content storage 142 made through web interface 124, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user account. A user of the user account can directly interact with client device 150, for example when client device 150 is a desktop or laptop computer, phone, television, internet-of-things device, etc. Alternatively or additionally, client device 150 can act on behalf of the user account without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, word processor, spreadsheet program, presentation program, source code control tool, etc. that resides on client device 150 and is capable of communicating with content management system 110. In various implementations, client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While this disclosure presents content management system 110 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

While system 100 is presented with specific components, it will be understood by one skilled in the art, that the architectural configuration of system 100 is simply one possible configuration and that other configurations with more or fewer components are possible.

A user engagement can be input provided by a user to an application or activity or status of an application, each of which are part of the interactions between the user and the application. For example, user engagement can include user activity such as keypresses, mouse movements, mouse clicks, selections (e.g., using a touch-screen interface), voice input, body movement (e.g., to be recorded by a camera, etc.), etc. User engagement can also include application activity such as modifying an image on a display (e.g., displaying a notification or dialog window within an open application; changing the state of a GUI element, such as blinking or changing color; etc.), modifying the status of indicators (e.g., a power or disk activity LED), emitting sound (e.g., music, speech, alerts, etc.), engaging actuators (e.g., moving a wheel, moving a camera into position, etc.), using resources (e.g., processor or network usage), etc. User engagement can also include a status of an object of the application (e.g. a window being in focus, a variable being set or set with a specific value, etc.).

In some embodiments, user engagement is predicted even if not immediately detected. For example, client application 152 on client device 150 can determine a schedule for the user (e.g., based on the user's calendar or detected habits such as a sleep and/or work schedule) and the schedule can indicate that the user will likely engage or not engage with client device 150 or an application executing on client device 150. For example, based on past engagement, a user might likely interact with a word processing application during the day and a web browser at night.

User engagement can mean that client device 150 has recently attempted to attract a user's attention. Examples of attracting attention include making a sound through a speaker, messaging the user's portable electronic device, presenting a notification (e.g., toast, pop-up, dialog-box/ modal, contextual notification), highlighting or shading a GUI object, sending an email, etc.

User engagement can include providing output for the user (e.g., via audio, video, graphical user interface objects, etc.). User engagement can mean that a graphical user interface associated with the relevant application process is open, active, or in focus (e.g., ready to receive user input, the top-most GUI element in an operating system, or having a focus characteristic). User engagement can mean that a graphical user interface associated with client application 152 is the top-most user interface (e.g., window) of an operating system graphical user interface. User engagement can include a user being present (e.g., determined by detecting a portable electronic device (such as client device 172) associated with the user being close to a personal computer (such as client device 170), or by detecting the user via an input from a camera of client device 150, or by detecting activity associated with the respective user account, etc.). User engagement can be based on active processes on client device 150; for example, user engagement can include a user initiating a synchronize or download operation using content item synchronization service 156 or scheduling a backup process. User engagement can be based on client device 150 resource usage (e.g., bandwidth, power, random access memory, processor resources, etc.) and whether the resource usage is above a threshold.

User engagement can include a "camera upload" process including a device (e.g., a camera, phone, or external drive) being connected and a camera upload prompt being active and in focus. A camera upload process can include copying a file from the device. A camera upload process can include uploading content items to content management system 106.

User engagement can include system tray or menu bar activity. For example, an icon associated with client application 152 can be visible, a cursor can hover over the icon (i.e., mouseover), a tooltip for the icon can be visible, etc. System tray or menu bar activity can include a tray (or menu) being open, the cursor hovering over the tray, and/or the tray being in focus. Other similar activity can include user clicking a menu item, a scroll operation through menu options, a selection of a menu option, etc.

User engagement can include preference window activity. For example, the relevant application process can have an associated preference window GUI element. User engagement can include having the preference window open and/or in focus. User engagement can include a cursor hovering over the preference window or elements of the preference window. User engagement can include a selection of a GUI element of the preference window. User engagement can include receiving a selection to change tabs of different menus in the preference window.

User engagement can involve a sharing procedure. For example, user engagement can include a sharing GUI object being open such as provided by client collaboration service 160 or client application 152, the sharing GUI object being in focus, the sharing GUI object being in the foreground, the sharing GUI object being selected, etc.

User engagement can involve a context menu being shown or a cursor hovering over the context menu. User engagement can involve a user selecting a context menu option.

User engagement can involve a GUI overlay such as the collaboration companion interface, described above. The GUI overlay can be placed on or adjacent to another application. User engagement can include a cursor hovering on the GUI overlay. User engagement can include the GUI overlay being active, being expanded, displaying comments, displaying a context menu, or receiving input.

A flow can be a set or sequence of one or more user engagements. In some cases, a flow can be an ordered sequence of user engagements. Example flows can include drafting an email, surfing the web, viewing settings, responding to a notification, interacting with a document or other content item, modifying settings, listening to music, sharing a content item with another user, etc. A flow can be associated with a single user's engagement. For example, a flow can include receiving a user's right click on a file, client device 150 displaying a context menu, receiving a selection of a share option, which closes the context menu, and ends the flow. Note, that the presentation of a sharing interface responsive to the received selection of the share option can initiate another flow.

A flow can also be associated with multiple non-simultaneous user engagements, and this can include a record of past user interactions, which can include metadata such as timing values. An example of a flow with multiple non-simultaneous user engagements is replying to an email; the associated user engagements can include: providing a notification of a received email, displaying an email-drafting window on a screen, receiving inputs from a user, and sending the reply email. This flow can exist in multiple states. The flow can first exist when the notification of a received email is provided. The flow can be updated to include the displaying of the email-drafting window. The flow can be further updated upon detecting that the email-drafting window is receiving inputs from a user. Finally, the flow can include the user engagement of sending the email. Additionally, flows do not have to be mutually exclusive. For example, a user engagement can be part of multiple different flows as described above in the example of a user engaging with a contextual menu and then engaging with a sharing interface, wherein the user engagement is part of a contextual menu flow and a sharing flow. A flow can specify time periods or other contexts for the collection of user engagements.

A flow profile can be a defined flow specifying one or more identifications of user engagements that should generally not be interrupted with application updates. A flow profile can be a predetermined template of user engagements, which can be used to identify times when a user is interacting with an application and should not be interrupted with an update. The identified user engagements can be selected from possible user engagements.

It should be understood that in addition to a collection or sequence of user engagements, a flow profile can include relationships between user engagements (e.g., a relative ordering of user engagements), timing between user engagements, and a delay duration (e.g., an amount of time to delay before attempting to install after a flow profile match is determined). It should be understood that the amount of time can be the same between each user engagement or can be different between different sets or sequences of user engagements in a flow profile.

In some embodiments, a flow profile can include an expected duration of a user engagement. For example, the system can determine a maximum duration to complete the user engagements for the flow profile and set an associated expected duration accordingly. In some embodiments, the complexity of the associated user engagements can inform the expected duration (e.g., simple tasks can have a shorter expected duration while more complex tasks can have a longer expected duration).

In some implementations, operative flows (and their constituent user engagements) can be identified based on available flow profiles (and their constituent user engagements). For example, an administrator can create various flow profiles, and a system can identify operative flows based on which user engagements or user engagement types are in those flow profiles.

A match between an operative flow and a flow profile can be defined in a variety of ways, and can even be flow profile specific. In some cases, a flow profile can specify an order or sequence among the multiple user engagements. For these types of flow profiles an operative flow will match the flow profile when all or a threshold number of the operative flow user engagements occur in the order or sequence specified in the flow profile. Alternatively, a flow profile can be an unordered set of one or more user engagements. For these types of flow profiles an operative flow will match the flow profile when all or a threshold number of the operative flow user engagements occur in the flow profile, regardless of order. A flow profile can include match parameters that indicate the type of match required (e.g., exact, subset, subsequence), a threshold match value (e.g., percentage of matching user engagements between the operative flow and the flow profile), and/or specific user engagements that must match (e.g., user engagements 1, 3, and 4; or user engagements 1-3 of 6). A flow profile can also specify an end condition parameter to indicate that a flow is complete (e.g., a particular user engagement, such as a window close action) or should no longer be considered a match (e.g., a maximum amount of time between specified user engagements in a flow profile, which when exceeded, indicate the operative flow and the flow profile should no longer be considered a match). The flow profile parameters can be set in a variety of ways, such as manually by the flow profile definer or through statistical analysis (e.g., of user actions and/or install history).

FIG. 2A shows an example method 200 for defining flow profiles by correlating collections of user engagements with update-timing undesirability. Update-timing undesirability is a measure of how undesirable it is to perform an update at a certain time, primarily in regards to the user experience. It should be understood that the principles herein can be applied to update-timing desirability.

A system can gather data pertaining to collections of user engagements and update-timing undesirability (step 202). For example, a system can record a collection of actions, contexts, activity, and other user engagements over a period of time. At the end of the period of time, the system can then prompt a user to apply an update. If the user rejects the prompt (e.g., by selecting "remind me later" or similar), this can inform the system that the update timing was undesirable. The collection of user engagements can then be associated with an update timing that is undesirable. In some embodiments, the undesirability can be a Boolean value (e.g., true or false) or on a scale (e.g., 0-1). A scale value for update-timing undesirability can be determined based on a user's reaction time to an update prompt. For example, if a user reacts quickly (e.g., less than 1 or 2 seconds) to reject the prompt, it can be an indication that the user strongly desired to not perform an update at that time—the urgency in rejecting the prompt can be an indication that the user would consider the update, should it occur to be more disruptive. Whereas, a longer period to react by the user can be an indication of a user's more casual reaction towards the prompt that can be an indication that while the user may still not want the update right now, that the update, should it occur, might be less disruptive.

The system can determine correlations between collections of user engagements and update-timing undesirability (step 204). The system can apply a regression analysis or a similar analytical method on the collections to determine user engagements and combinations of user engagements that result in undesirable update timings. This determination can include sequences of user engagements, timings between user engagements, durations of user engagements, elapsed time from a user engagement to the relevant update timing, etc. that lead to undesirable update timings. The system can determine that some user engagements or sequences of user engagements contribute to update-timing undesirability, some mitigate or eliminate update-timing undesirability (e.g., closing a window), and some have no impact.

The system can store flow profiles identifying user engagements that correlate with update-timing undesirability (step 206). The system can construct flow profiles based on the determinations of step 204. For example, a particular collection or sequence of user engagements can be associated with update-timing undesirability and can thus be saved as a flow profile. In some embodiments, a collection of user engagements detected in step 202 can be modified to remove user engagements that were determined to not have an effect on update-timing undesirability.

It should be understood that a system can perform example method 200 iteratively to experiment and tease out causal relationships between user engagements and update-timing undesirability. For example, the system can attempt applying an update after detecting different user engagements to determine how those user engagements influence update-timing undesirability. Machine learning principles can be applied, e.g., by training a neural network or other machine learning model with training data that employs sets of user engagements (flows) as input data to the machine learning model and adjusting model parameters based on a comparison of the model output to whether a user decided to install an update in the context of those input user engagements. Learnings from such a trained model could then later be used to create or modify a flow profile.

In some embodiments, multiple computing devices associated with multiple users can all perform step 202 and the system can "learn" based on a population of users. In some embodiments, users are grouped into populations of similar types (e.g., consumer, professional, young, adult, lawyer, teacher, student, personal account, professional account, corporate account, etc.) and such groupings can help inform the correlations determined in example method 200. For example, account database 140 can be used to learn a grouping for user accounts, and different or flows can be applied to user accounts based on its grouping. For example it might be determined a student account takes longer to complete a flow, while a professional might address a flow more quickly. In some embodiments these variations between accounts can be determined using machine learning techniques.

In some embodiments, additional or alternative to example method 200, a developer or system administrator can manually create flow profiles. For example, the developer or system administrator can determine that a collection of user engagements should be associated with update-timing undesirability and the developer or system administrator can create a flow profile accordingly.

FIG. 2B provides an example method 220 for associating user engagements with update-timing undesirability, which can be performed as a sub-process of step 202. A system can record a collection of user engagements (step 208). The collection of user engagements can include all activity by an associated user as well as activity and statuses of the relevant computing device and/or programs. The recording can be performed over a period of time such as a few seconds or minutes.

The system can determine if applying an update would be undesirable at the current time (step 210). For example, a system can prompt a user if they would want to update their application. Over a large enough number of user responses, it can be concluded with a statistical probability that an update is desirable or undesirable during an observed condition.

Another example includes applying the update and determining if the user experience is interrupted. A system can detect that a user experience is interrupted by determining that a user has engaged the application and the application did not respond as it would under normal operation such as might happen if the application appears frozen during the update, or determining that the user has engaged with the application during the update and the update restarts the application (or computer). A system can also detect that a user experience is interrupted by detecting that the update has caused the application to lose session information; this might require the user to repeat a procedure to get back to where the user was with the application.

If applying the update is undesirable, the system can indicate that the collection is associated with update-timing undesirability (step 212). In contrast, if applying the update is not undesirable, the system can indicate that the collection is not associated with update-timing undesirability (step 214). It should be understood that update-timing undesirability need not be limited to Boolean values; for example, update-timing undesirability can be on a scale, as described above.

Figure 3:
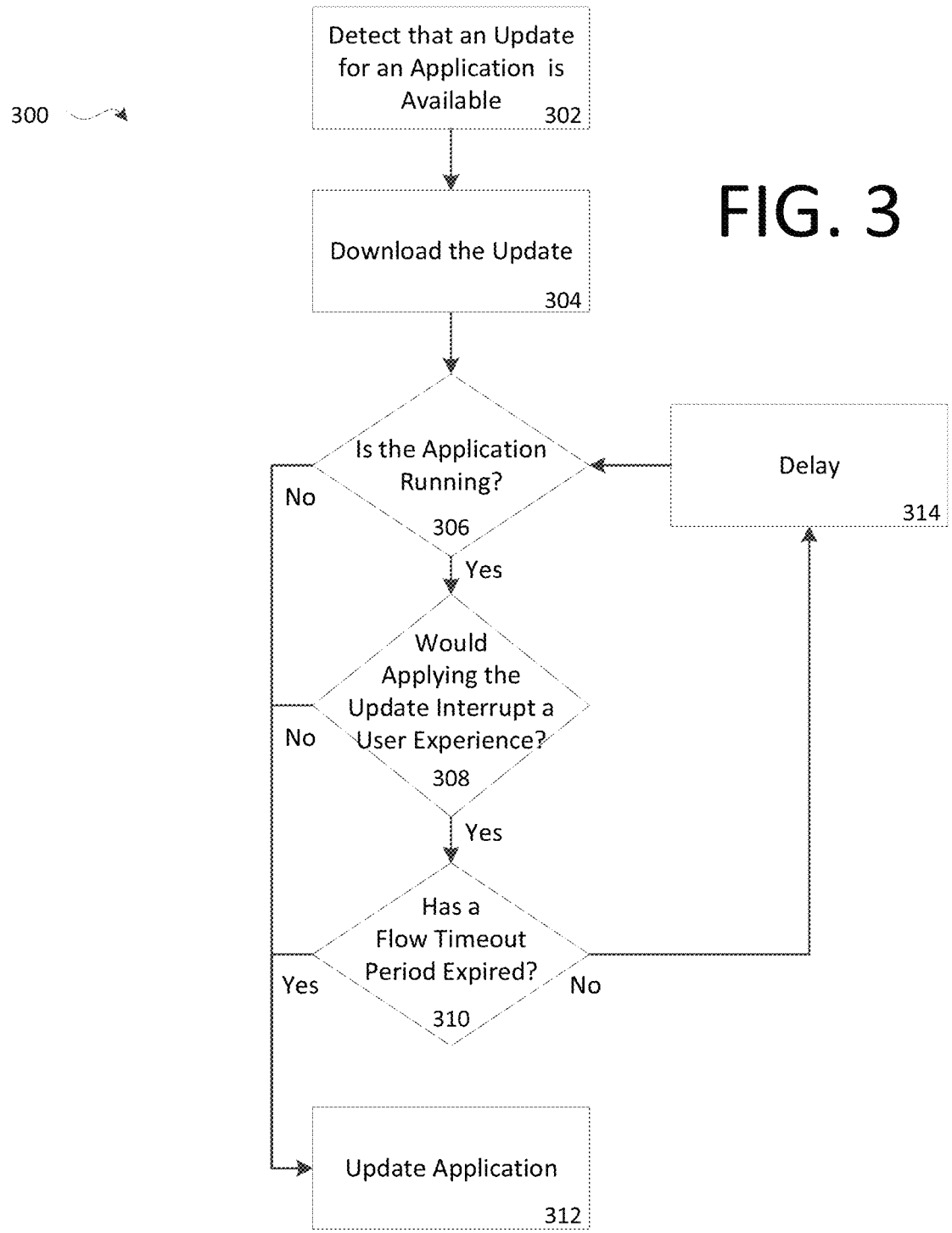
FIG. 3 shows an example method for updating an application based on user engagement.

FIG. 3 shows example method 300 for updating an application based on user engagement. In some embodiments, the system or process that performs example method 200 can also perform example method 300; alternatively, distinct systems or processes can perform example methods 200 and 300 in concert. Example method 300 includes detecting that an update for an application is available (step 302). Step 302 can include communicating with an update server. Step 302 can include receiving a message that the update is available. An update timer can signal that a scheduled update should be available and can inform or trigger step 302.

The update for the application can be a patch type update, which a system can apply to the application. The update for the application can be an update for a portion or process of the application. The update for the application can be an update for data associated with the application distinct from program instructions or code. In some embodiments, the application (or portion of the application) is a website (or a web-view of the website), and updating the application includes refreshing the website. In some embodiments a flow profile indicating user engagement can also include data indicating types of updates that might interfere with the particulate user engagement relevant to the flow profile. In such embodiments, if a flow profile may permit some updates when they don't interfere with the user engagement relevant to the flow profile.

Example method 300 can include downloading the update (step 304). For example, downloading the update from an update server. In some embodiments, the downloading includes downloading patching software that can download and/or install a patch to the application. An application update (i.e., an "updated version of the application") can be, for example, an installation file, a binary executable, a patch, a script, a data file, etc. that can be applied to at least a portion of the application to update the application or to augment or replace data accessible by the application.

Example method 300 can include determining if the application is running (step 306). Step 306 can include querying a user interface watcher process, a host operating system, an application process, etc. on client device 150 to determine whether the user is engaged with client application 152. In some embodiments, the query is specific to the process or portion of the application to which the update will be applied.

Example method 300 can include determining if applying the update would interrupt a user experience (step 308). For example, a system performing this method can query a user interface watcher process to determine if a user activity flag is active. In some embodiments, a system performing example method 300 can determine if there are any matches between an operative flow and one or more flow profiles indicating user activity—even if a user activity flag is not utilized or set. Step 308 can include identifying matching flow profiles based on collections of user engagements. In some implementations, identifying matching flow profiles based on collections of user engagements and/or setting the activity flag can be performed using the process described below in relation to FIG. 4.

Step 308 can include determining a type of update and determining whether to install the update depending on whether installing that type of update will result in a disruption of the user experience. For example, the type of update can be one that requires a restart of the operating system, a restart of the application, a restart of a process of the application, dedication of a certain amount of resources (e.g., a processor-intense update, an update that requires client device 150 to use a significant amount of bandwidth, etc.), etc. The type of update can be an update that requires user interaction (e.g., a user must authorize the update, a user must enter credentials for the update, the update has greater than a threshold amount of user prompts, etc.).

In some embodiments, the update, or portion of the update, only requires interruption of a portion of the application (e.g., one module or process requires a restart while the remaining modules and processes can continue operation). Client device 150 can identify the flows, respective processes, and/or respective user engagements that have caused the activity flag to be set, client device 150 can then determine if the update, or portion of the update, will not affect those flows, processes, and/or user engagements. For example, if a user is interfacing with a billing menu of the application and a portion of the update pertains to an email functionality of the application, a system can update email functionality without interrupting the user engagement of the billing menu. In some embodiments, "application" in step 306 applies to only a portion of an application—the portion that the update affects.

Some types of user engagements can facilitate updating the application without interruption or user inconvenience. A system can identify and compare these types of user engagements with a type of the update. For example, if the user engagement includes the user closing a portion of the application (e.g., exiting a menu, closing a dialog box, applying settings, etc.), the application can update (including a restart) without significantly interrupting the user. Because, in some embodiments, the user expects a break in the interactivity with the application (e.g., as a user command is executed), the user might not be bothered by the application updating before, during, or after the user command is executed. Example user engagements that can facilitate updating the application can include closing a window, saving a content item, sending/sharing a content item, downloading a content item, etc.

Example method 300 can include determining if a flow timeout period has expired (step 310). Step 310 can include identifying matched flow profiles and determining if they all have expired timeout periods. If all of the matched flow profiles have expired timeout periods, step 310 can yield an affirmative determination. In some embodiments, determining if a matched flow profile has an expired timeout period can include de-registering or deactivating a flow profile that has expired.

In some embodiment the timeout period for the matched flow profile can be adjusted based on observed conditions that client device 150 is experiencing. For example, if the flow pertains to an operation that is at least partially dependent on computing resources, the flow profile can take into account the current or expected availability of computing resources (e.g., network bandwidth, memory bandwidth, memory size, processing power, active threads, etc.) and adjust the timeout period to accommodate low availability or poor performance of computing resources. In some embodiments, low availability or poor performance of computing resources can be accommodated by delay 314 addressed below.

In some embodiments, example method 300 can include determining if an override timeout period has expired (310). For example, the first time a system runs step 310, an override timeout period can be set (e.g., a few hours or days). If the override timeout period expires and the system has not applied the update, the system can force the update even if there are matching flow profiles that would otherwise prevent the update from continuing. In some embodiments, the override timeout period is set based on an importance of the update. In some embodiments, the update specifies the override timeout period.

In some embodiments, example method 300 can include determining whether the update is a critical update. For example, the update (or update provider) can specify that it is a critical update. In some implementations, an update can be critical because it addresses security concerns of the application. In some implementations, an update can be critical because, without it, the application will lose certain functionality (e.g., if an associated content management system 106 API will be changing soon and the application will be deprecated). In some implementations, an update can be critical if it fixes functionality of the application. In some embodiments, an updater process on client device 150 can mark the update as critical if it alters critical components of the application. For example, an updater process can determine that the update will alter a kernel process of the application, in contrast to the update altering a GUI component that might not be critical.

In some embodiments, an update is given a criticality score that describes a degree of criticality (e.g., highly critical, moderately critical, not critical). A system can compare this criticality score with importance values for matching flow profiles. For example, a matching flow profile having moderate importance can cause a system to postpone an update that is not critical while a highly critical update can interrupt the matching flow profile of moderate importance. This criticality comparison can occur as part of any step within example method 300. For example, less important user engagements can include clicking a tray icon, navigating help documentation, navigating a file hierarchy, passive engagements, etc. More important user engagements can include the user inputting data, making unsaved changes (e.g., setting preferences that have not been applied), etc.

In some embodiments, a criticality determination is made after step 304 and before 306 and, if the update is critical, a system performing example method 300 can bypass steps 306, 308, and 310.

Example method 300 can include delaying (step 314) if the flow timeout period has not expired. This delay can be preset (e.g., "10 seconds") or variable. Characteristics of the matching flow profiles can inform a variable delay. For example, the greater the number of matching flow profiles, the greater the delay can be. In some embodiments, the delay is based on anticipated user engagement durations, as indicated in the flow profiles. In some embodiments, the delay iteratively increases. For example, the first time a system encounters step 314, the delay can be 1 second, the next time the delay can be 10 seconds, followed by a minute, an hour, etc. In some embodiments, the delay iteratively decreases, wherein the first time a system encounters step 314, the delay can be 1 minute, the next time the delay can be 30 seconds, followed by a 10 seconds, 1 second, etc.

Example method 300 can include updating the application (step 312) if step 306 or step 308 yield a negative determination or if step 310 yields an affirmative determination. Updating the application can follow a determination that it is the best time to update the application based on steps 306, 308, and/or 310 and any other conditions or procedures. Updating the application (step 312) can include downloading the update (step 304).

The order and arrangement of the steps shown in FIG. 3 are examples and this disclosure contemplates other orders and arrangements. For example, a system can perform at least some steps simultaneously or in an alternate order. A system can omit or add steps.

Figure 4:
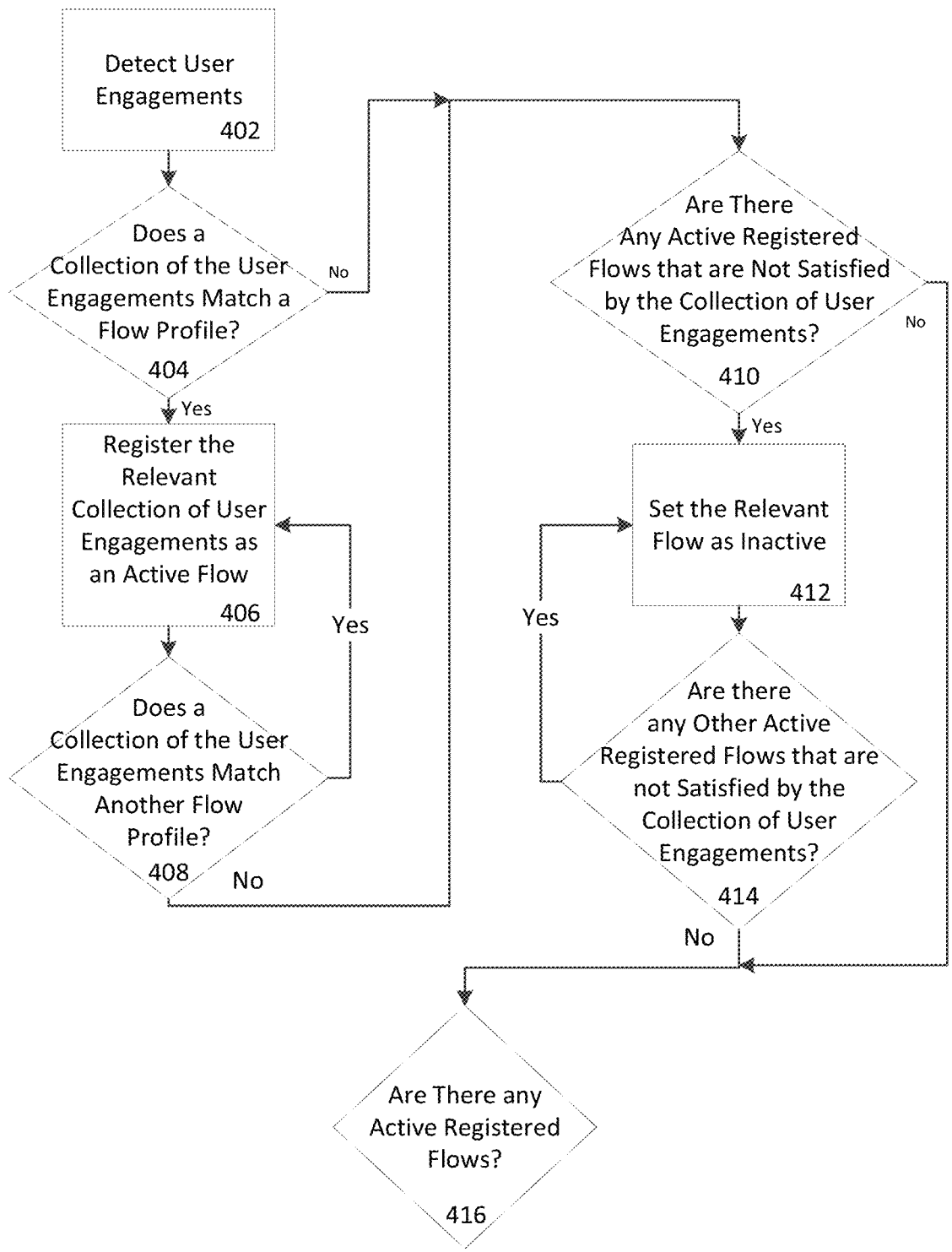
FIG. 4 shows an example method for setting a user activity flag by determining if there are active registered flows by matching operative flows to flow profiles.

FIG. 4 provides an example method for performing at least a portion of step 308. The system can detect user engagements (step 402) by querying a user interface watcher process, a host operating system, an application process, etc. on client device 150 to determine whether the user is engaged with client application 152.

The system can determine if an operative flow matches a flow profile (step 404). For example, if the user engagements for the operative flow detected in step 402 comprise user engagements A, B, C, D, and E. In such embodiments, any flow profiles that reference any of user engagements A, B, C, D, and E will match the operative flow.

If a collection of the user engagements matches a flow profile, the system can register the operative flow as matching a flow profile (step 406). An application process can communicate with a user interface watcher process to register the operative flow. The user interface watcher process can maintain a database of matched flow profiles. In some embodiments, each matched flow profile can be set to active or inactive.

The system can then determine if a collection of the user engagements match another flow profile (step 408). Using the above example, if a first collection of user engagements A and B match a first profile, a second collection of user engagements A, B, and C can match a second profile. The collection of step 408 (and any subsequent collections) can include the same, fewer, more, or different user engagements in comparison to those of step 408. If another collection of user engagements matches another flow profile, the system can return to step 406.

If there are no more collections of user engagements to match flow profiles, the system can determine whether there are any active registered flows that are not satisfied by the user engagements (step 410). This can include referencing the flow (and/or its associated flow profile) and determining whether the user engagements disclosed in the flow are active or present in the set of user engagements detected in step 402. In some embodiments, a system can add triggers or hooks to user engagements to automatically disable the associated flow when the user engagement (or collection of user engagements) ends. For example, if the user engagement is a window being presented by an application, when the application closes the window, the process that closes the window can automatically identify any flows that are active because of the window being presented.

If there is a flow that is no longer satisfied, the system can set the relevant flow as inactive (step 412). Setting a flow as inactive can include deregistering the flow.

If there are no other flows that are not satisfied by the user engagements, the system can determine if there are any active registered flows (step 416). In other words, the system can determine if installing an update at this point would interrupt a user. In some embodiments, step 416 is a true or false determination, alternatively, step 416 can result in a value on a scale. In some embodiments, step 416 includes combining values of active registered flows (e.g., summing the values).

In some embodiments, before step 404, all active registered flows are deactivated (thus obviating the need for steps 410-414). In some embodiments, the only way a registered flow can be deactivated is through a flow timeout.

The order and arrangement of the steps shown in FIG. 4 are examples and this disclosure contemplates other orders and arrangements. For example, a system can perform at least some steps simultaneously or in an alternate order. A system can omit or add steps.

Figure 5:
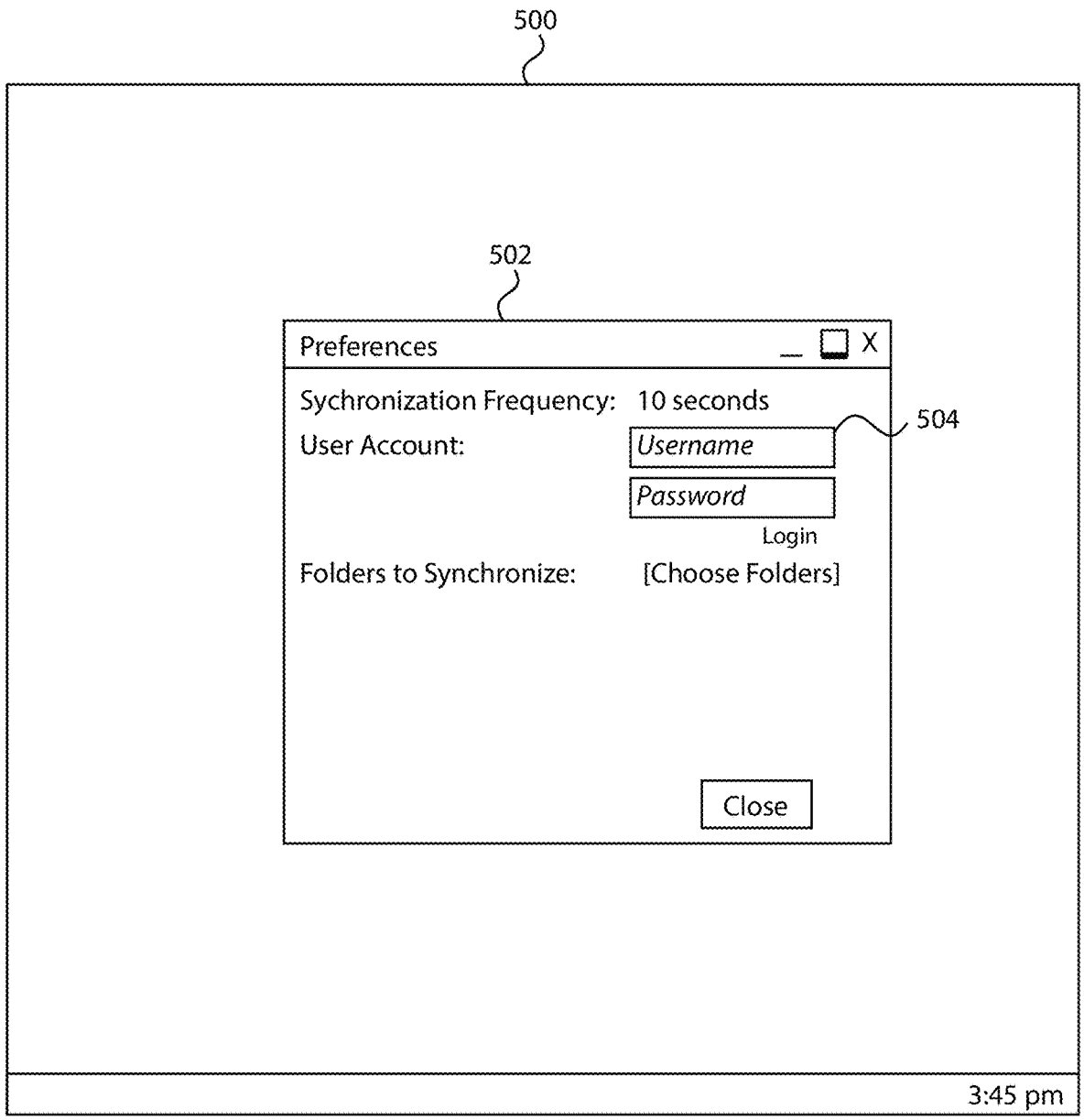
FIG. 5 shows an example graphical user interface.

FIG. 5 shows an example graphical user interface 500. In some implementations, graphical user interface 500 can be an operating system graphical user interface. Graphical user interface 500 can include application graphical user interface 502. An application that registers a flow with a user interface watcher process can provide application graphical user interface 502. In FIG. 5, application graphical user interface 502 can be in focus. "In focus" can mean that it is the topmost window of graphical user interface 500. Input field 504 can receive user input. User engagement can include the input field 504 being in focus (e.g., selected and ready to receive input) or that a user is actively providing input.

Figure 6A:
FIGS. 6A, 6B, and 6C show an example sharing flow.
Figure 6B:
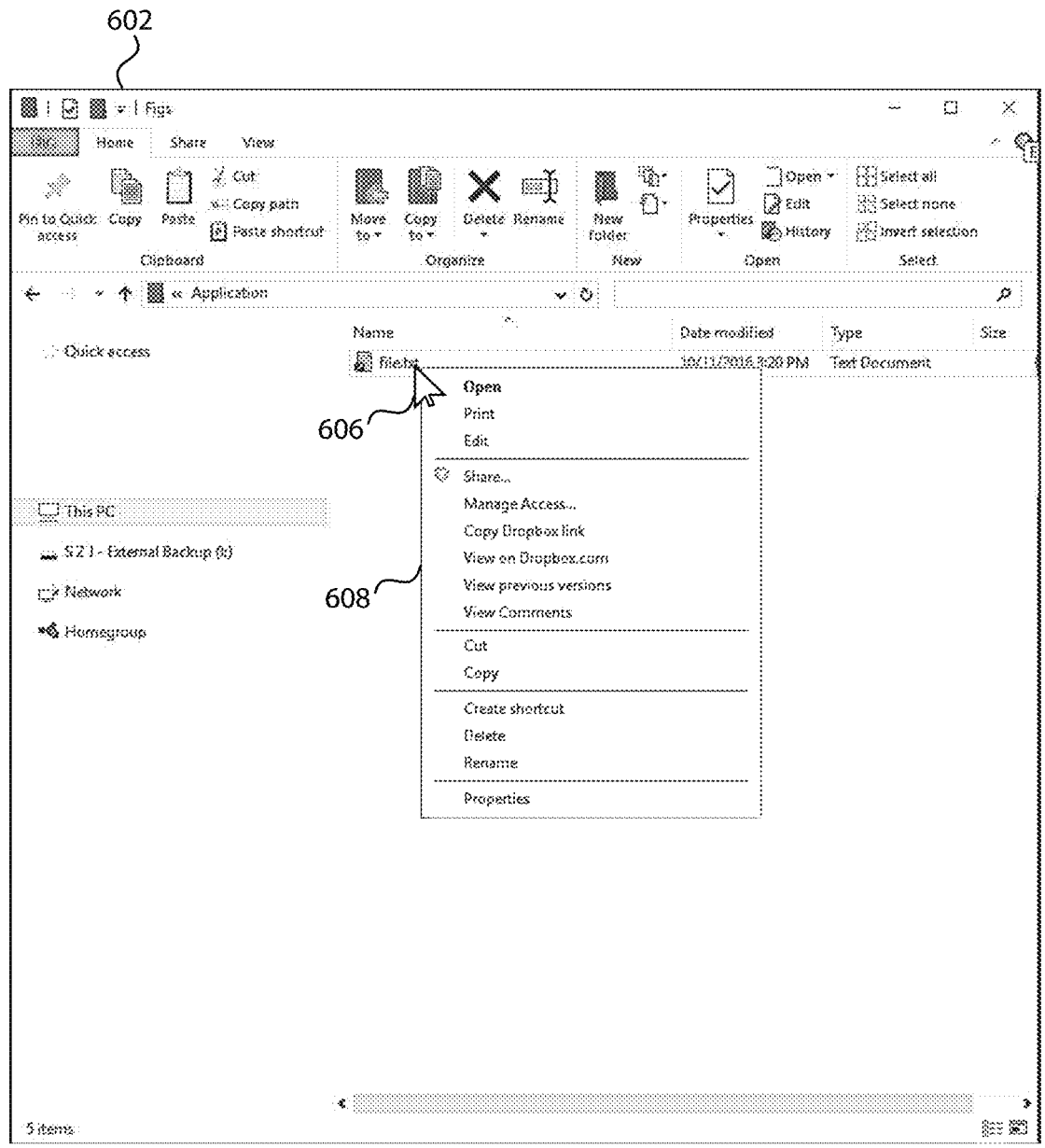
Figure 6C:
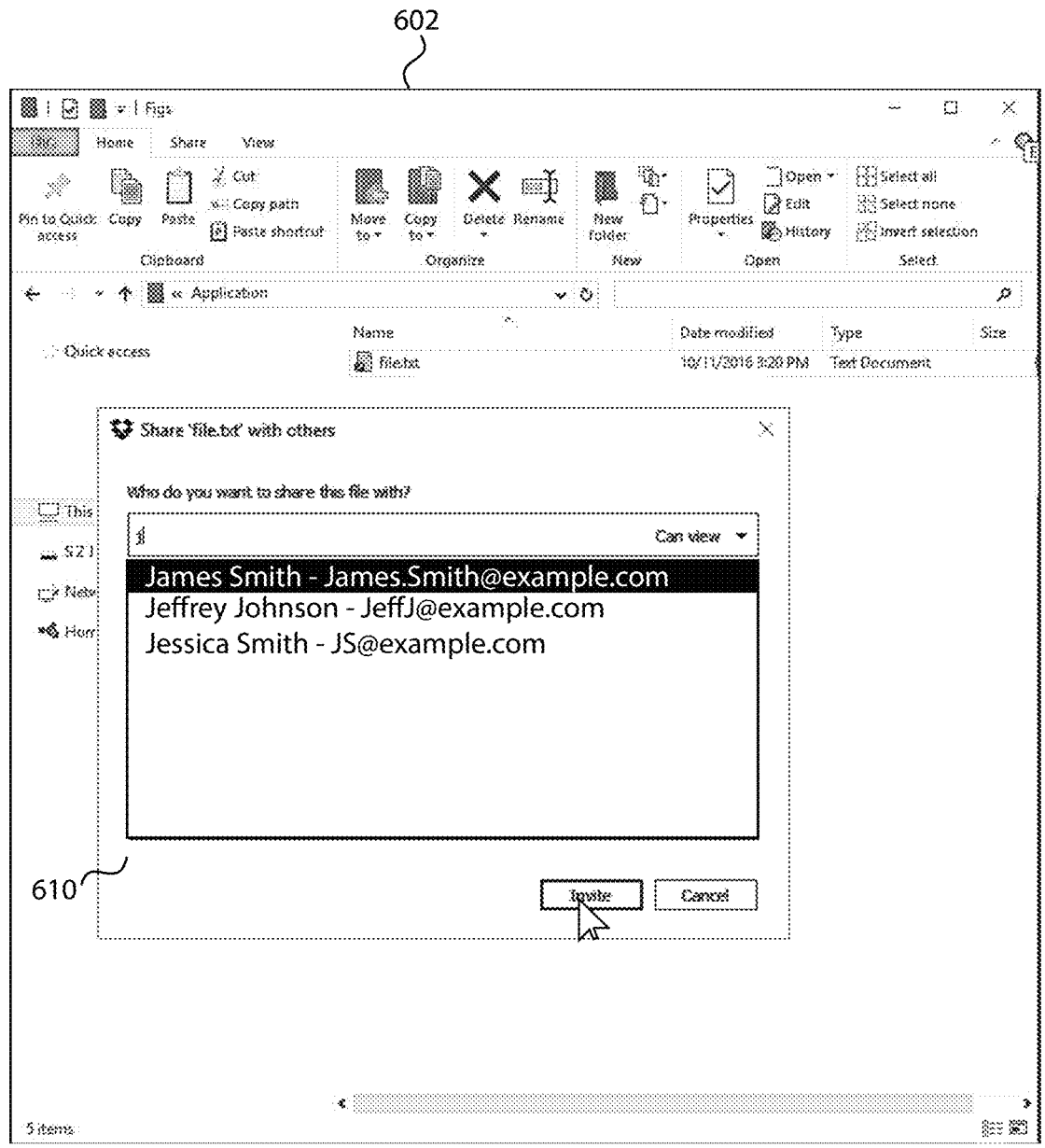

FIGS. 6A-6C show an example sharing process according to some implementations. FIG. 6A shows file interface GUI 502 containing content item 504. FIG. 6B shows how a user can select content item 504 and context menu 508 can appear. A user can then select to share content item 504 by selecting a share option in context menu 508. FIG. 6C shows share window 510 which can provide some share options and accept a selection to share content item 504 with selected user accounts. If an updater process were to restart a process controlling share window 501, this could result in share window 510 closing prematurely and disrupting the user experience.

In some embodiments, a flow includes a computing device displaying file interface GUI 502. In some embodiments, a flow includes file interface GUI 502 having focus. In some embodiments, a flow can include cursor 506 hovering over file interface GUI 502, context menu 508, and/or share window 510. In some embodiments, a flow can include a selection of content item 504. A flow can include a user providing input to share a content item in share window 510. A flow can include a user selecting to share a content item. Each of these examples, GUI 502 having focus, displaying context menu 508, displaying share window 510, etc, are user engagements indicating one or more operative flows. These user engagements can be matched to one or more flow profiles. Client application 152 can register any matched flow profiles, which can prevent an update from being installed until completion of the operative flows. Each matched flow can be associated with a timeout period, after which client application 152 can determine if the operative flow is still being engaged. If the operative flow is still engaged, the application update can be delayed. If the operative flow(s) have completed, the flow profile can be unregistered and client application 152 can be updated.

Figure 7A:
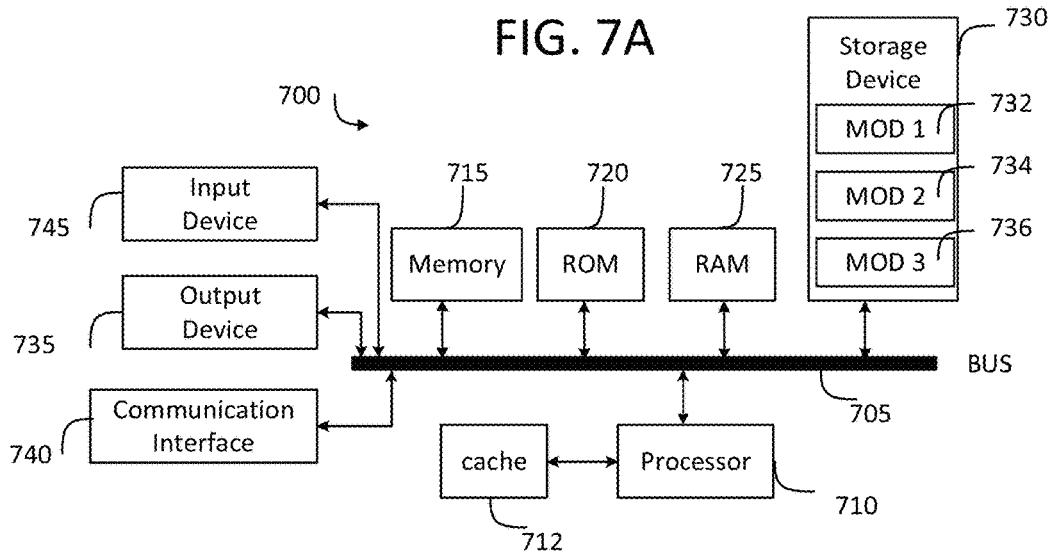
FIG. 7A shows an example system embodiment for implementing various embodiments of the present technology.
Figure 7B:
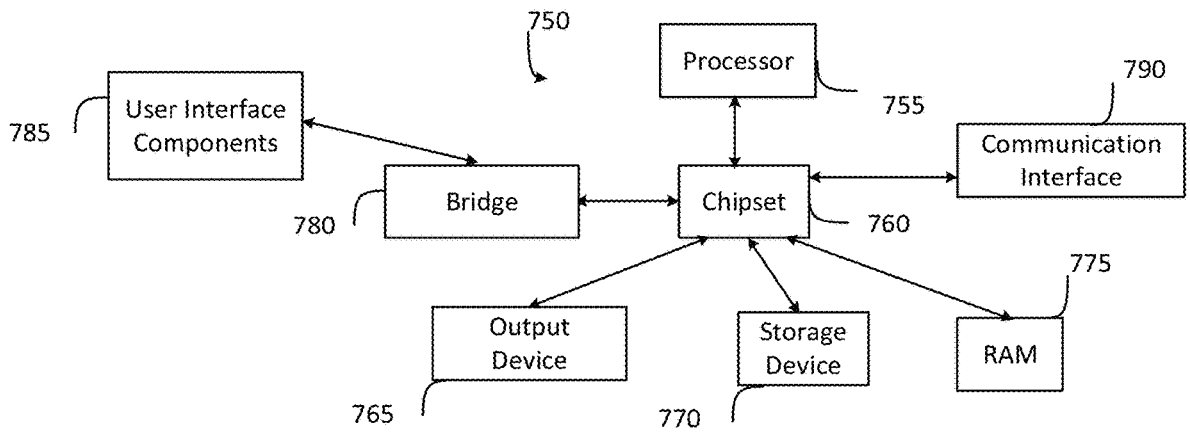
FIG. 7B shows an example system embodiment for implementing various embodiments of the present technology.

FIG. 7A and FIG. 7B show example possible system embodiments. The appropriate embodiments will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here can be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules can exist. The storage device 730 connect to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can interface with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances, the present technology may be presented as including individual functional blocks including functional blocks comprising devices, device components, steps or routines in a method embodied in software, or combinations of hardware and software.

A combination of hardware and software modules, alone or in combination with other devices can perform or implement any of the steps, operations, functions, or processes described herein. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Peripherals or add-in cards can embody the functionality described herein. As another example, a circuit board among different chips or different processes executing in a single device can also implement such functionality.

The instructions, media for conveying such instructions, computing resources for executing them, and other structures for supporting such computing resources are means for providing the functions described in these disclosures.

As used herein, being above a threshold means that a value for an item under comparison is above a specified other value, that an item under comparison is among a certain specified number of items with the largest value, or that an item under comparison has a value within a specified top percentage amount. As used herein, being below a threshold means that a value for an item under comparison is below a specified other amount, that an item under comparison is among a certain specified number of items with the smallest value, or that an item under comparison has a value within a specified bottom percentage amount. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although this disclosure uses a variety of examples and other information to explain aspects within the scope of the appended claims, this does not imply limitation of the claims based on particular features or arrangements in such examples, as one of ordinary skill would be able to use these examples to derive a wide variety of implementations. Further and although this disclosure may describes some subject matter in language specific to examples of structural features and/or method steps, the subject matter defined in the appended claims is not necessarily limited to these described features or acts. For example, such functionality can be distributed differently or performed in components other than those identified herein. Rather, this disclosure provides the described features and steps as examples of components of systems and methods within the scope of the appended claims.

What is claimed is:

1. A computer-implemented method comprising:
   downloading, by a computing system, an update for an application installed on the computing system, wherein the application is associated with a content management system;
   collecting, by the computing system, an operative flow of one or more user engagements with the application, wherein the one or more user engagements with the application comprises input provided by a user to the application, an activity of the application, and a status of the application;
   comparing, by the computing system, the operative flow with flow profiles associated with the application installed on the computing system, wherein each flow profile comprises a predetermined template of a collection of user engagements with the application;
   determining, by the computing system, that the operative flow matches a matching flow profile of the flow profiles;
   in response to determining that the operative flow matches the matching flow profile, setting, by the computing system, an activity flag to an active status indicating that installing the update for the application will interrupt user engagement with the application;
   determining, by the computing system based on the activity flag, that installing the update for the application will interrupt user engagement with the application;
   in response to determining, by the computing system, that installing the update for the application will interrupt user engagement with the application, delaying installing the update for the application;
   detecting, by the computing system, a change in a status of the activity flag to an inactive status; and
   in response to detecting the change in the status of the activity flag to the inactive status, installing, by the computing system, the update to the application.

2. The computer-implemented method of claim 1, wherein collecting an operative flow of one or more user engagements with the application comprises:
   recording, by the computing system, the one or more user engagements with the application over a defined period of time.

3. The computer-implemented method of claim 2, wherein recording the one or more user engagements with the application over a defined period of time is performed by a user interface watcher process executing on the computing system.

4. The computer-implemented method of claim 1, wherein determining that the operative flow matches the matching flow profile comprises:
   determining that a threshold number of the one or more user engagements in the operative flow match one or more user engagements in the matching flow profile.

5. The computer-implemented method of claim 4, wherein the collection of one or more user engagements in the matching flow profile is an ordered sequence of one or more user engagements, and wherein determining that a threshold number of the one or more user engagements in the operative flow match one or more user engagements in the matching flow profile comprises:
   determining that the threshold number of the one or more user engagements in the operative flow match the one or more user engagements in the matching flow profile in the order specified in the matching flow profile.

6. The computer-implemented method of claim 4, wherein the matching flow profile has an associated match parameter specifying a threshold match value, and wherein the threshold number is based at least in part on the threshold match value.

7. The computer-implemented method of claim 1, wherein the matching flow profile has an associated expected duration, and wherein the change in the user activity flag is based on detecting, by the computing system, that the expected duration has expired.

8. The computer-implemented method of claim 1, wherein the matching flow profile has an associated end condition, and wherein the change in the user activity flag is based on determining, by the computing system, that the associated end condition is satisfied.

9. The computer-implemented method of claim 1, wherein the change in the user activity flag is based on detecting, by the computing system, that an override timeout period has expired.

10. A non-transitory computer readable medium storing instructions, the instructions, when executed by a computing system, cause the computing system to perform operations comprising:
    detecting that an update for an application installed on the computing system is available, wherein the application, associated with a content management system, has access to content items for synchronization of the content items with the content management system;
    detecting that at least one flow profile for the application is available, wherein the flow profile comprises a predetermined template of a collection of user engagements with the application;
    identifying an operative flow of one or more user engagements with the application, wherein the one or more user engagements with the application comprises input provided by a user to the application, an activity of the application, and a status of the application;
    comparing the operative flow with the at least one flow profile;
    determining whether the operative flow matches any flow profile of the at least one flow profile for the application;
    in response to determining that the operative flow does not match at least one flow profile for the application, installing the update for the application; and
    in response to determining that the operative flow matches at least one flow profile for the application, delaying installation of the update for the application.

11. The non-transitory computer readable medium of claim 10, wherein identifying an operative flow for the application comprises:
   recording user engagements with the application;
   selecting a collection of one or more user engagements from the recorded user engagements, wherein the each user engagement in the collection of user engagements occurred during a defined period of time; and
   defining the operative flow based on the collection of user engagements.

12. The non-transitory computer readable medium of claim 11, wherein selecting a collection of one or more user engagements and defining the operative flow is in response to detecting that an update is available.

13. The non-transitory computer readable medium of claim 10, wherein determining whether the operative flow matches at least one flow profile for the application comprises:
   determining whether a threshold number of the one or more user engagements in the operative flow match one or more user engagements in at least one flow profile for the application.

14. The non-transitory computer readable medium of claim 10, wherein the operations further comprise:
   in response to determining that the operative flow matches at least one flow profile for the application, updating an activity flag to indicate that installing the update for the application will interrupt at least one user engagement flow with the application.

15. The non-transitory computer readable medium of claim 14, wherein the activity flag is a counter representing a number of current matches between operative flows and flow profiles for the application.

16. The non-transitory computer readable medium of claim 10, wherein delaying installation of the update for the application comprise delaying until a delay termination condition is satisfied, wherein the delay termination condition is at least one of: expiration of an override timeout period, expiration of an expected duration for the at least one profile, or an end condition is satisfied for the at least one flow profile.

17. A system comprising:
   one or more processors; and
   a non-transitory computer readable medium storing instructions that, when executed by the one or more processors, cause the system to perform operations comprising:
      detecting that an update for an application installed on the system is available, wherein the application, associated with a content management system, has access to content items for synchronization of the content items with the content management system;
      detecting that a first flow profile for the application is available, wherein the first flow profile comprises a first predetermined template of a collection of user engagements with the application;
      identifying a first operative flow of one or more user engagements with the application, wherein the one or more user engagements with the application comprises input provided by a user to the application, an activity of the application, and a status of the application;
      comparing the first operative flow with the first flow profile;
      determining that the first operative flow matches the first flow profile associated with the application; and
      delaying installation of the update for the application until a first termination condition is satisfied.

18. The system of claim 17, wherein the operations further comprise:
   detecting that the update for the application is a critical update; and
   overriding the delaying by installing the update for the application.

19. The system of claim 17, wherein the operations further comprise:
   identifying a second operative flow for the application;
   determining that the second operative flow matches a second flow profile associated with the application, wherein the second flow profile comprises a second predetermined template of the collection of user engagements with the application; and
   delaying installation of the update for the application until a second termination condition is satisfied.

20. The system of claim 19, wherein the first termination condition is a first override timeout period and the second termination condition is a second override timeout period, and wherein the second override timeout period is shorter than the first override timeout period.

21. The system of claim 19, wherein identifying the second operative flow for the application occurs prior to satisfying the first termination condition.

22. The system of claim 17, wherein the operations further comprise:
   downloading the update for the application in response to detecting that the update for the application is available.

23. The system of claim 17, wherein the operations further comprise:
   detecting that the first termination condition is satisfied; and
   installing the update for the application.

24. The system of claim 17, wherein the operations further comprise:
   downloading the update for the application in response to detecting that the first termination condition is satisfied.

25. The system of claim 17, wherein the operations further comprise:
   determining that the update for the application will be applied to a first portion of the application;
   determining that the first flow profile is associated with a second portion of the application, wherein the first portion and the second portion are distinct portions of the application; and
   overriding the delaying by installing the update of the application.

\* \* \* \* \*